(12) United States Patent
Iwabuchi

(10) Patent No.: US 11,465,363 B2
(45) Date of Patent: Oct. 11, 2022

(54) VIBRATION WELDED ARTICLE, VIBRATION WELDING APPARATUS, AND METHOD OF MANUFACTURING VIBRATION WELDED ARTICLE

(71) Applicant: MORIROKU TECHNOLOGY COMPANY, LTD., Tokyo (JP)

(72) Inventor: Kazuhiko Iwabuchi, Tokyo (JP)

(73) Assignee: MORIROKU TECHNOLOGY COMPANY, LTD., Tokyo (JP)

(*) Notice: Subject to any disclaimer, the term of this patent is extended or adjusted under 35 U.S.C. 154(b) by 0 days.

(21) Appl. No.: 17/587,053

(22) Filed: Jan. 28, 2022

(65) Prior Publication Data

US 2022/0242052 A1    Aug. 4, 2022

(30) Foreign Application Priority Data

Feb. 1, 2021    (JP) .............................. JP2021-014176

(51) Int. Cl.
   *B29C 65/06*   (2006.01)
   *B29C 65/00*   (2006.01)
   *B29L 31/30*   (2006.01)

(52) U.S. Cl.
   CPC ........ *B29C 65/069* (2013.01); *B29C 66/1122* (2013.01); *B29L 2031/3058* (2013.01)

(58) Field of Classification Search
   CPC .... B29C 65/06; B29C 65/069; B29C 66/1122
   USPC ........................................................ 156/73.5
   See application file for complete search history.

(56) References Cited

U.S. PATENT DOCUMENTS 8,251,435 B2 *   8/2012   Ezaka ..................... B29C 65/06
                                                    296/180.1

FOREIGN PATENT DOCUMENTS

JP    2010-208058        9/2010
JP    2011-016495 A      1/2011

\* cited by examiner

*Primary Examiner* — James D Sells
(74) *Attorney, Agent, or Firm* — Rankin, Hill & Clark LLP

(57) ABSTRACT

A vibration welded article includes an outer member having a substantially V-shaped portion, and an inner member that is vibration welded to the outer member. The outer member includes a substantially plate-shaped base surface portion, and a slope portion formed obliquely relative to the base surface portion. The slope portion has an outer member opening which is opened to attach another component. The inner member includes a first joint surface portion that is vibration welded to the base surface portion, a second joint surface portion that is vibration welded to the slope portion, and at least one protruding portion that protrudes from the second joint surface portion toward the base surface portion.

8 Claims, 6 Drawing Sheets

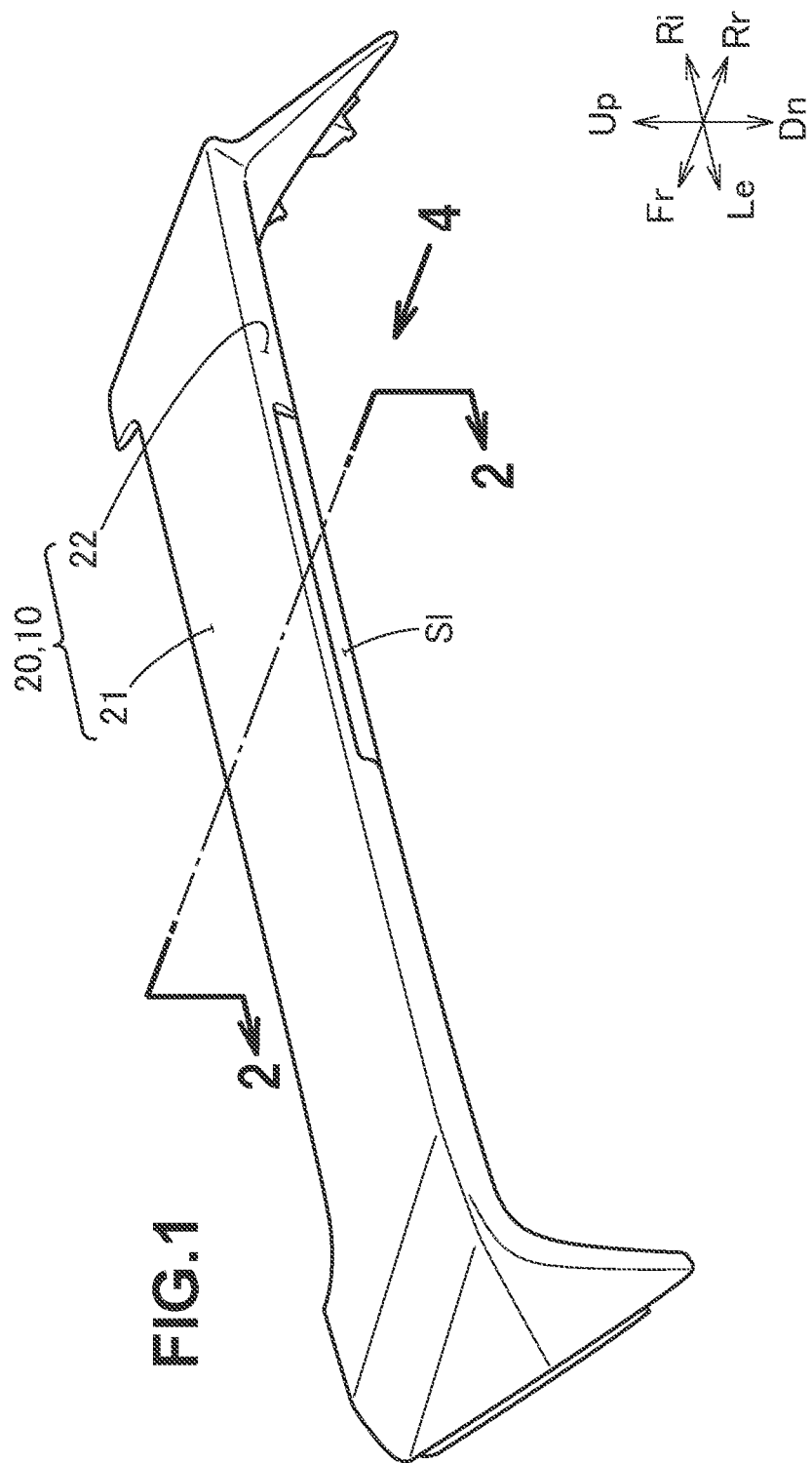

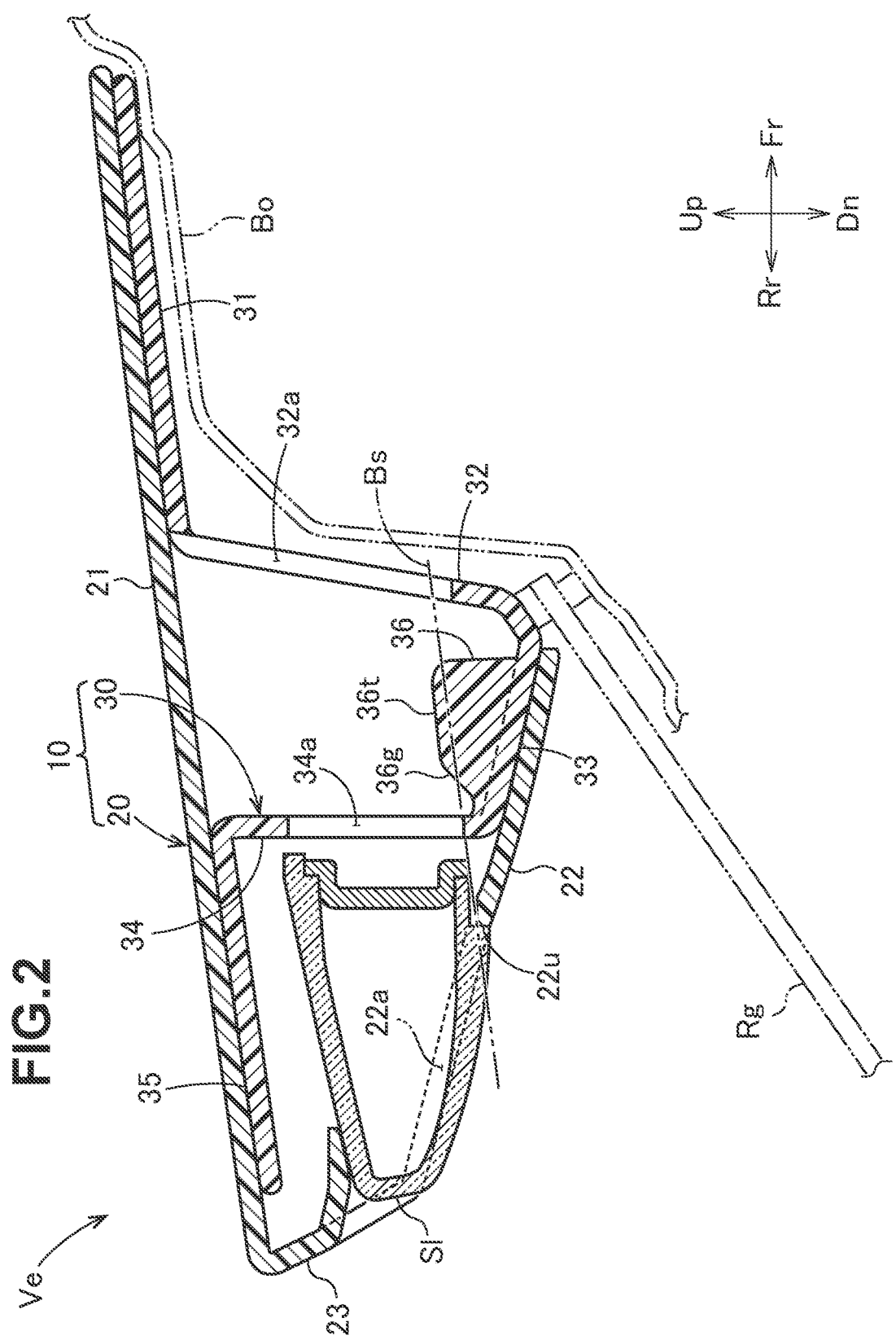

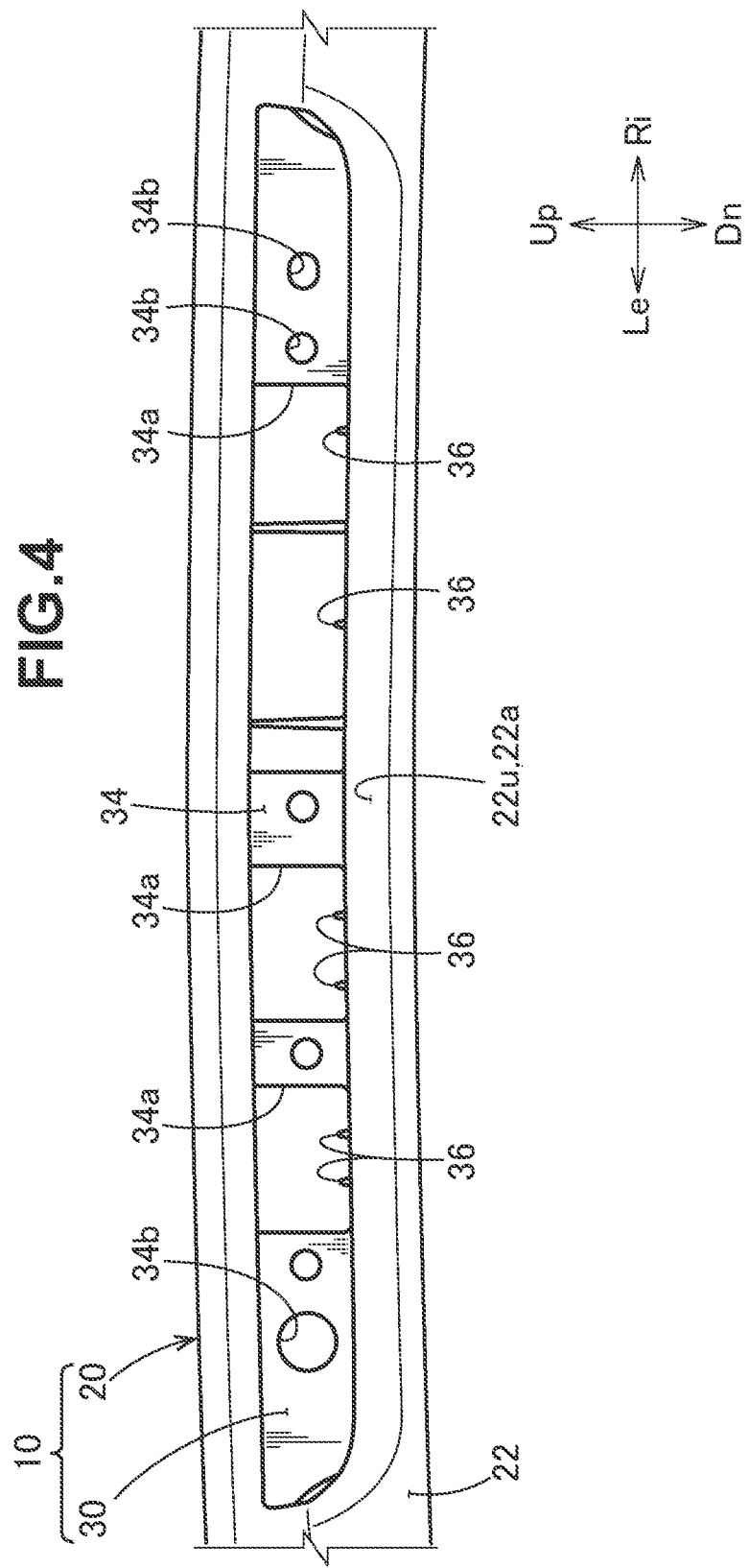

VIBRATION WELDED ARTICLE, VIBRATION WELDING APPARATUS, AND METHOD OF MANUFACTURING VIBRATION WELDED ARTICLE

FIELD OF THE INVENTION

The present invention relates to a vibration welded article in which a plurality of resin parts are vibration welded, a vibration welding apparatus for obtaining a vibration welded article, and a method of manufacturing a vibration welded article.

BACKGROUND OF THE INVENTION

For example, a resin component, which may be referred to as a tailgate spoiler, may be provided at an upper area of a tailgate provided at a rear part of a vehicle. One example of the tailgate spoiler is a vibration welded article (product) in which a plurality of resin components are vibration welded. JP-A-2010-208058 discloses a conventional technology related to such a vibration welded article.

A vibration welded article shown in JP-A-2010-208058 has an outer member including a substantially V-shaped portion, and an inner member disposed inside the substantially V-shaped portion of the outer member and vibration welded to the outer member.

The outer member has a substantially plate-shaped base surface portion, and a slope portion which is inclined relative to the base surface portion and faces the base surface portion. The inner member has a first joint surface portion which is vibration welded to the base surface portion, and a second joint surface portion which is vibration welded to the slope portion.

When the vibration welding is carried out, vibrations are applied while pressing the first joint surface portion toward the base surface portion, and the slope portion is pressed toward the second joint surface portion.

Because the two components are integrated with each other by the vibration welding, it is unnecessary to use an adhesive or the like, and it is possible to provide high-quality appearance.

SUMMARY OF THE INVENTION

Since the tailgate spoiler disclosed in JP-A-2010-208058 is provided at the upper area of the rear end of the vehicle, visibility from following vehicles is high. Therefore, an opening may be provided in the slope portion of the outer member of certain types of vehicles and a brake lamp may be disposed in the opening.

In such a configuration, it has been found that when the slope portion is pressed with a jig (auxiliary jig) as disclosed in JP-A-2010-208058, the following problem may occur. The strength of the slope portion is reduced by the formation of the opening. Therefore, if the slope portion is welded while being pressed by the jig, there is a possibility that the inner member cannot be welded sufficiently to the outer member due to large deflection of the slope portion or the like.

When a vibration welded article having an opening, which is not limited to the tailgate spoiler, is manufactured, it is desired to weld the inner member to the outer member with high strength.

The present invention provides a technology that can weld an inner member to an outer member with high strength.

According to the present disclosure, there is provided a vibration welded article (product) that includes:

an outer member including a substantially V-shaped portion; and an inner member disposed inside the substantially V-shaped portion of the outer member and vibration welded to the outer member, the outer member including a substantially plate-shaped base surface portion, and a slope portion formed obliquely relative to the base surface portion and facing the base surface portion, the slope portion including an outer member opening which is opened to attach another component, and the inner member including a first joint surface portion that is vibration welded to the base surface portion, a second joint surface portion that is vibration welded to the slope portion, and at least one protrusion that protrudes from the second joint surface portion toward the base surface portion.

BRIEF DESCRIPTION OF THE DRAWINGS

FIG. 1 is a perspective view of a tailgate spoiler that is an example of a vibration welded article according to a first embodiment of the invention.

FIG. 2 is a cross-sectional view taken along the line 2-2 in FIG. 1.

FIG. 4 is a view when looked at in the direction of the arrow 4 in FIG. 1 to illustrate a state where a brake lamp, which is an example of as another component, is removed.

DETAILED DESCRIPTION OF THE PREFERRED EMBODIMENTS

Figure 3A:
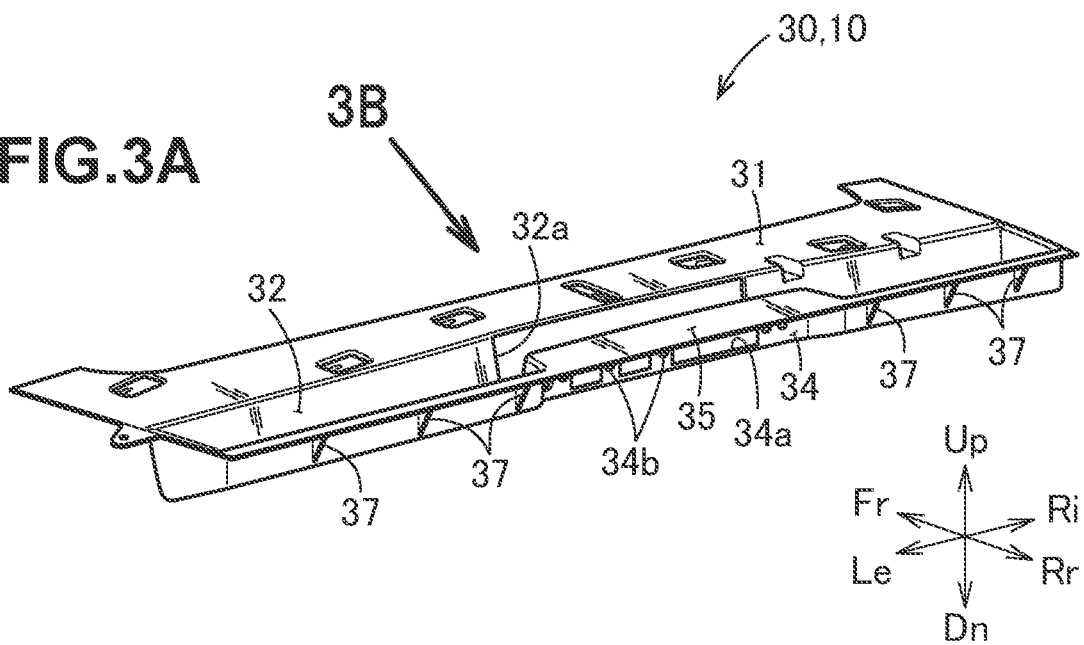
FIG. 3A is a perspective view of an inner member shown in FIG. 2

Embodiments of the present invention will be described below with reference to the accompanying drawings. In the following description, the terms "left" and "right" refer to the left and right when viewed from a person in a vehicle, and the terms "front" and "rear" refer to the front and rear when viewed in the traveling direction of the vehicle. In addition, "Fr" in the drawing represents the front, "Rr" represents the rear, "Le" represents the left when viewed from the person in the vehicle, "Ri" represents the right when viewed from the person in the vehicle, "Up" represents the top or up, and "Dn" represents the bottom or down.

First Embodiment

Referring to FIGS. 1 and 2, a tailgate spoiler 10, which is an example of a vibration welded article 10 and hereinafter referred to as the spoiler 10, is provided on a rear end upper portion of the vehicle Ve. The spoiler 10 is attached to a vehicle body Bo for the purpose of improving the aerodynamic characteristics of the vehicle Ve and enhancing the design of the vehicle Ve.

The spoiler 10 extends continuously rearward from the rear end upper portion of the vehicle body Bo and also extends laterally in a vehicle width direction. A rear glass Rg is provided below the spoiler 10.

Referring to FIG. 2, the spoiler 10 includes an outer member 20 including a substantially V-shaped portion, and an inner member 30 disposed inside the substantially V-shaped portion of the outer member 20 and vibration welded to the outer member 20.

The spoiler 10 is provided with a stop lamp SI, which is an example of another component SI and hereinafter referred to as the lamp SI. The lamp SI emits light when the brake is activated, and is used to make a following car recognize that the vehicle Ve is decelerating.

The outer member 20 is a design member made of a resin that is visible from the outside of the vehicle Ve. The outer member 20 includes a substantially plate-shaped base surface portion 21 extending rearward continuously from the ceiling of the vehicle body Bo, a slope portion 22 which inclines relative to the base surface portion 21 and faces the base surface portion 21, and a connecting portion 23 which connects the base surface portion 21 to the slope portion 22.

The slope portion (inclined surface portion) 22 has an outer member opening 22a that can receive and mount the lamp SI. The slope portion 22 inclines, for example, 20 degrees relative to the base surface portion 21. This angle is preferably 30 degrees or less. The reason will be described later.

The inclination angle of the slope portion 22 relative to the base surface portion 21 is different from the inclination angle of the connecting portion 23 relative to the base surface portion 21. Incidentally, a following configuration is also possible; the slope portion 22 may extend from the end of the base surface portion 21 without the connecting portion 23.

The inner member 30 includes a first joint surface portion 31 which is vibration welded to the base surface portion 21, a standing wall portion (vertical wall portion) 32 which is raised toward the slope portion 22 from the first joint surface portion 31, a second joint surface portion 33 which extends from the vertical wall portion 32 along the slope portion 22 and vibration welded to the slope portion 22, an auxiliary wall portion 34 extending toward the base surface portion 21 from the second joint surface portion 33, an auxiliary leg portion 35 extending along the base surface portion 21 from the auxiliary wall portion 34, and protrusions 36 protruding toward the base surface portion 21 from the second joint surface portion 33.

Referring to FIG. 3A, the inner member 30 also includes a plurality of ribs 37 connecting the auxiliary wall portion 34 to the auxiliary leg portion 35.

The left and right ends of the first joint surface portion 31 project forward, and the remaining portion of the first joint surface portion 31 is formed to have substantially the same width in the front-rear direction. The first joint surface portion 31 may have a large number of convex portions of slight height (welding ribs) on its surface that contacts the base surface portion 21 (see FIG. 2) in order to facilitate the vibration welding.

Referring also to FIG. 2, the standing wall portion 32 is inclined rearward relative to a surface that stands vertically from first joint surface portion 31 and the base surface portion 21. The standing wall portion 32 has an inner member opening 32a which is opened at a position facing the outer member opening 22a.

The inner member opening 32a is a substantially rectangular opening elongated in the right-left direction. The inner member opening 32a is formed only in a portion of the standing wall portion 32 that faces the lamp SI. When the height of the inner member opening 32a is measured from the base surface portion 21, at least a portion of the inner member opening 32a is formed at the same height as the outer member opening 22a.

Figure 3B:
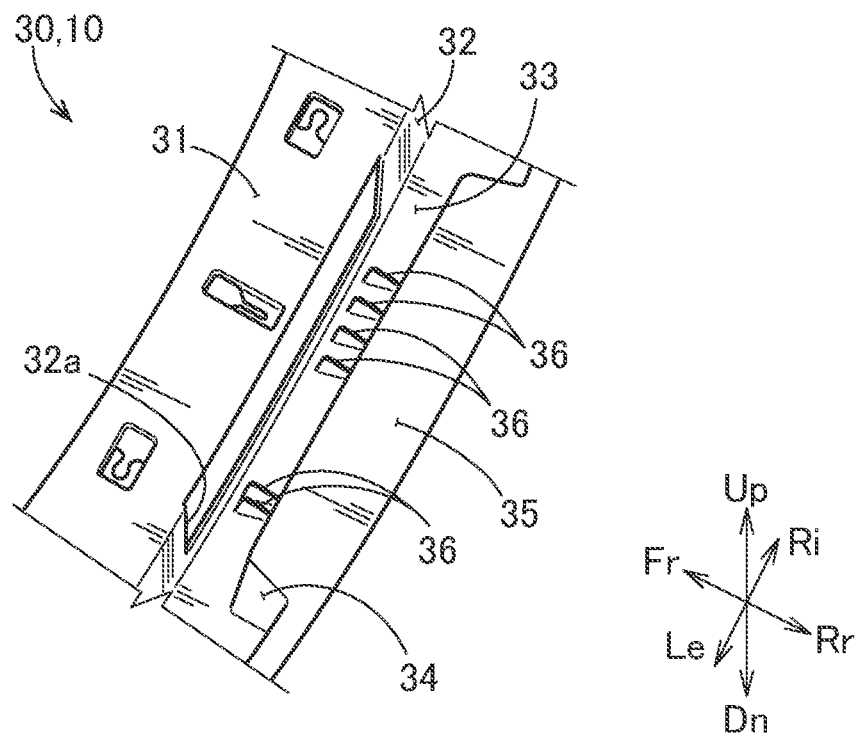
FIG. 3B is a view when looked at in the direction of the arrow 3B in FIG. 3A.

Referring to FIGS. 2 and 3B, the front-rear width of that portion of the second joint surface portion 33, which is in front of the area where the lamp SI is disposed, is narrower than the front-rear width of the remaining portions of the second joint surface portion 33. A large number of convex portions of slight height (welding ribs) may be formed on the surface of the second joint surface portion 33 in contact with the slope portion 22 in order to facilitate the vibration welding. The second joint surface portion 33 formed along the slope portion 22 is inclined, for example, 20 degrees relative to the base surface portion 21.

Referring to FIGS. 2 and 3A, that portion of the auxiliary wall portion 34, in which the lamp SI is disposed, is formed in a concave shape toward the front. Referring to FIG. 4, a plurality of auxiliary wall openings 34a and 34b having different shapes are formed in the auxiliary wall portion 34. From the auxiliary wall openings 34a formed in a substantially rectangular shape, it is possible to visually recognize distal ends of the protrusions 36. The auxiliary wall openings 34b, each of which is formed in a round hole shape, include, for example, holes for fixing the mounting portions of the lamp SI (see FIG. 2) with fastening members, and holes for receiving the positioning features of the lamp SI (e.g., cross pins).

The auxiliary wall openings 34a are formed only in that portion of the vertical wall portion 32 which faces the lamp SI. When the height of each of the auxiliary wall openings 34a is measured from the base surface portion 21, at least a portion of each of the auxiliary wall openings 34a is formed at the same height as the outer member opening 22a and the inner member opening 32a.

Referring to FIGS. 3A and 3B, only that portion of the auxiliary leg portion 35, which is situated above the lamp SI, as shown in FIG. 2 has a greater width in the front-rear direction.

It should be noted that the auxiliary leg portion 35 may be vibration welded to the base surface portion 21 (see FIG. 2) or it may not be vibration welded to the base surface portion 21. The spoiler 10 may be reinforced by the auxiliary wall portion 34 and the auxiliary leg portion 35.

The protrusions 36 are formed in parallel to each other and extend in the front-rear direction. Referring also to FIG. 2, it can be said that a plurality of protrusions 36 are formed along a direction in which the inclined surface portion 22 extends from the base surface portion 21. There is no possibility that water droplets or the like flowing through the auxiliary wall opening 34a would stay in a joint portion between the second joint surface portion 33 and the protrusions 36.

As particularly shown in FIG. 2, the distal end surface (top face) 36t of each of the protrusions 36 is formed substantially parallel to the base surface portion 21. On the other hand, the distal end surface 36t of each of the protrusions 36 inclines relative to the second joint surface portion 33. As described above, in the configuration in which the second joint surface portion 33 inclines 20 degrees relative to the base surface portion 21, the distal end surface 36t substantially parallel to the base surface portion 21 inclines substantially 20 degrees relative to the second joint surface portion 33.

When a virtual (imaginary) surface extending from a lower edge 22u of the outer member opening 22a in substantially parallel to the base surface portion 21 is taken as a reference surface Bs, the protrusions 36 protrude to a position closer to the base surface portion 21 than the reference surface Bs. In other words, if a virtual surface extending from one of edges of the outer member opening 22a, which is closest to the second joint surface portion 33, in substantially parallel to the base surface portion 21 is taken as the reference surface Bs, it can be said that the protrusions 36 protrude to a position closer to the base surface portion 21 than the reference surface Bs.

The extending direction of the protrusions 36, how many the protrusions 36 are formed, and the shape of the respective protrusions 36 may be decided optional.

Referring also to FIG. 3A, since the ribs 37 are formed, it is possible to suppress deformations of the outer member 20 and the inner member 30 when pressing the base surface portion 21 and the slope portion 22.

Next, a method of vibration welding the inner member 30 to the outer member 20 will be described.

Figure 5:
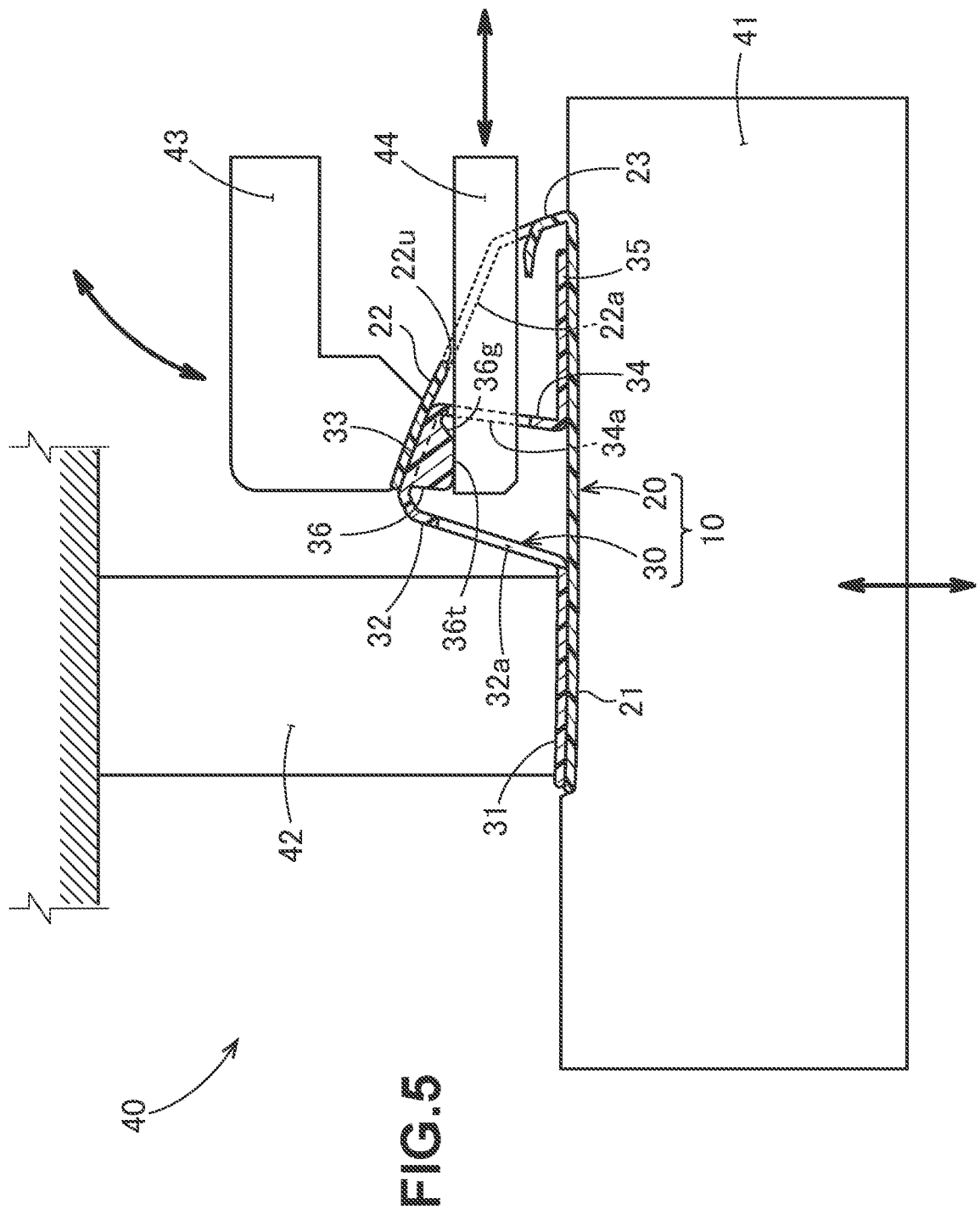
FIG. 5 is a view useful to describe a vibration welding apparatus for manufacturing the tailgate spoiler shown in FIG. 2.

Referring to FIG. 5, a vibration welding apparatus 40 for performing the vibration welding will be described. It should be noted that when performing the vibration welding, the outer member 20 is placed below, and the inner member 30 is disposed on top of the outer member 20. That is, the outer member 20 and the inner member 30 are placed upside down, as compared with FIG. 2.

The vibration welding apparatus 40 includes a receiving mold (die) 41 on which the outer member 20 is put and which can move up and down, a vibrating mold 42 which presses the first joint surface portion 31 toward the base surface portion 21 and generates vibrations to vibration weld the first joint surface portion 31 to the base surface portion 21, a pressing mold 43 which can swing toward the slope portion 22 to press the slope portion 22 toward the second joint surface portion 33, and a moving mold 44 which can move linearly from the outer member opening 22a toward the protrusions 36 to contact the protrusions 36.

When the vibration welding is carried out, first, the outer member 20 and the inner member 30 are placed on the upper surface of the receiving mold 41, and then the receiving mold 41 is lifted. The receiving mold 41 is lifted to a position where the first joint surface portion 31 is brought into contact with the vibrating mold 42. Subsequently, the moving mold 44 is caused to enter the outer member opening 22a until the upper surface of the moving mold 44 faces the protrusions 36. During this process, the moving mold 44 moves substantially perpendicularly to the moving direction of the receiving mold 41. Subsequently, the pressing mold 43 is caused to swing until the pressing mold 43 abuts against the slope portion 22.

At this time, there may be a small gap between the protrusions 36 and the moving mold 44. As described above, the welding ribs may be formed on the first joint surface portion 31. Therefore, the inner member 30 may float by an amount of the height of the welding ribs, and there may be a small gap between the distal end surfaces 36t of the protrusions 36 and the moving mold 44. When the base surface portion 21 is brought into close contact with the first joint surface portion 31, a small gap may be left between the distal end surfaces 36t of the protrusions 36 and the moving mold 44 due to dimensional errors (manufacturing tolerance). That is, keeping a state of sandwiching the slope portion 22 and the protrusion 36 during the process of welding the inner member 30 to the outer member 20 may include a state in which there is a small gap between the protrusions 36 and the moving mold 44.

The base surface portion 21 and the first joint surface portion 31 are sandwiched by the receiving mold 41 and the vibrating mold 42, and the slope portion 22 and the second joint surface portion 33 are sandwiched by the pressing mold 43 and the moving mold 44. In this state, the vibrating mold 42 is operated. Vibrations transmitted from the vibrating mold 42 generate frictional heat at the abutting portion between the base surface portion 21 and the first joint surface portion 31, and at the abutting portion between the slope portion 22 and the second joint surface portion 33. Because of this heat, the abutting portion between the base surface portion 21 and the first joint surface portion 31 is welded, and the abutting portion between the slope portion 22 and the second joint surface portion 33 is welded. The manufacturing of the spoiler 10 is completed upon the welding.

During the vibration welding, the slope portion 22 and the second joint surface portion 33 may deflect downward. If this occurs, the distal end surfaces 36t of the protrusions 36 come into contact with the moving mold 44. Thus, it is possible to suppress the large deflection of the slope portion 22 and the second joint surface portion 33.

It is more preferable that the inclination of the second bonding surface portion 33 relative to the base surface portion 21 is 30 degrees or less. If the inclination exceeds 30 degrees, there is a possibility that the pressing force from the pressing mold 43 is not transmitted sufficiently in the direction of pressing the slope portion 22 to the second joint surface portion 33. If the pressing force is not sufficiently transmitted, it is impossible to weld the second joint surface portion 33 to the slope portion 22.

It should be noted that the moving mold 44 may enter the outer member opening 22a while lifting or before lifting the receiving mold 41. It is preferred that the moving mold 44 enters the outer member opening 22a while sandwiching the base surface portion 21 and the first joint surface portion 31 between the receiving mold 41 and the vibrating mold 42 because it is possible to prevent the deviation of the inner member 30 which would be caused when the entering moving mold 44 interferes with the protrusions 36.

The above-described spoiler 10 has the following advantages.

The spoiler 10 has the protrusions 36 protruding from the second joint surface portion 33 toward the base surface portion 21. When pressing the slope portion 22, the second joint surface portion 33 can also apply the pressing force, and therefore it is possible to suppress the deflections of the outer member 20 and the inner member 30. If the protrusions 36 are not provided, it is necessary to directly press the second joint surface portion 33. In this case, however, there is a possibility that the edge or the like of the outer member opening portion 22a interferes and the second joint surface portion 33 cannot be sufficiently pressed. If the spoiler 10 that has the protrusions 36 is used, it is possible to easily support the second joint surface portion 33. Therefore, the inner member 30 can be welded to the outer member 20 with high strength.

Further, it is preferable to form a guide surface portion 36g, which serves as a guide, on that portion of each of the protrusions 36 which faces the outer member opening 22a. Specifically, it is preferred that each of the protrusions 36 has the guide surface portion 36g formed obliquely from the second joint surface portion 33 toward the distal end surface 36t. The guide surface portion 36g is inclined relative to a plane perpendicular to the distal end surface 36t. As a result, the moving mold 44 can be guided toward the distal end surfaces 36t.

Even when the vibration welding is performed using a device other than the vibration welding apparatus 40, the support from the second joint surface portion 33 can be easily obtained if the spoiler has the protruding portions 36. For this reason, since the protrusions 36 are formed on the spoiler 10, and the inner member 30 can be welded to the outer member 20 with high strength.

Referring also to FIG. 2, the standing wall portion 32 has the inner member opening 32a which is opened at a position facing the outer member opening 22a. Thus, it is possible to perform the mounting operation of the lamp SI from the inner member opening 32a. It is also possible to insert the moving mold 44 from the inner member opening 32a. Therefore, the assembling operation of the spoiler 10 can be easily performed. Further, it is possible to weld the inner member 30 to the outer member 20 with high strength even if the rigidity of the standing wall portion 32 for bearing the pressing force against the slope portion 22 during vibration welding is reduced. This enhances the degree of design freedom.

The protrusions 36 protrude to a position closer to the base surface portion 21 than the reference surface Bs. Thus, it is possible to support the second joint surface portion 33 in an easier manner during the vibration welding. It is particularly preferable from the viewpoint of welding the inner member 30 to the outer member 20 with high strength.

The distal end surfaces 36t of the protrusions 36 are formed on a surface intersecting the second joint surface portion. Because the protruding direction of the protrusions 36 is substantially the same as the direction of sandwiching the base surface portion 21 and the first joint surface portion 31 between the receiving mold 41 and the vibrating mold 42, it is possible to easily support the second joint surface portion 33. Simplification and design freedom of the moving mold 44 and the receiving mold 41 are also increased.

The protrusions 36 are parallel to each other and formed at a plurality of positions. By giving the support at a plurality of positions, it is possible to further suppress the deformations of the outer member 20 and the inner member 30. The inner member can be welded to the outer member with higher strength.

The manufacturing apparatus includes the moving mold 44 that can move from the outer member opening 22a toward the protrusions 36 and abut on the protrusions 36. Because the moving mold 44 can abut on the protrusions 36, it is possible to support the second joint surface portion 33 when pressing the slope portion 22. As a result, the inner member 30 can be welded to the outer member 20 with high strength.

The moving mold 44 enters the outer member opening 22a and proceeds toward the protrusions 36. By utilizing the outer member opening 22a which may cause a decrease in welding strength between the inner member 30 and the outer member 20, the moving mold 44 moves to the protrusions 36. This is preferable because the inner member 30 can be welded to the outer member 20 with high strength without making an opening or the like in another portion of the spoiler.

The distal end surfaces 36t of the protrusions 36 are substantially parallel to the base surface portion 21. Therefore, when the moving mold 44 is moved in a direction substantially perpendicular to the moving direction of the receiving mold 41, it is possible to cause the moving mold 44 to abut against the protrusions 36. It is possible to prevent the receiving mold 41 from interfering with the moving mold 44. Simplification and design freedom of the manufacturing apparatus are also increased.

When welding the inner member 30 to the outer member 20, a state of sandwiching the slope portion 22 and the protrusions 36 is kept. Thus, it is possible to suppress the deformations of the inner member 30 and the outer member 20 during the vibration welding. As a result, the inner member 30 can be welded to the outer member 20 with high strength.

Second Embodiment

Next, a spoiler 10A according to a second embodiment of the present invention will be described based on the drawings.

Figure 6:
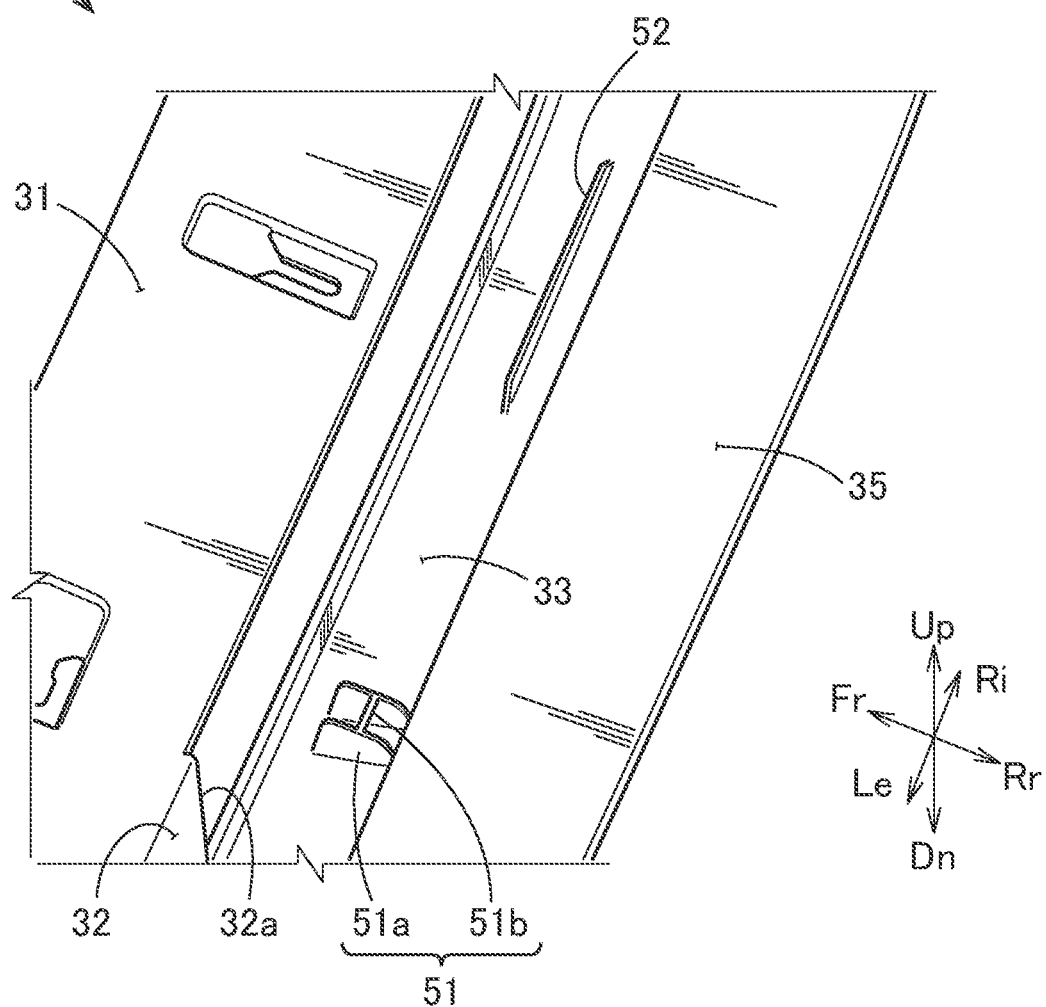
FIG. 6 is a plan view of an inner member used in a tailgate spoiler according to a second embodiment of the invention.

FIG. 6 illustrates a spoiler 10A according to the second embodiment, and shows the spoiler 10A in a similar way to FIG. 3B. The spoiler 10A of the second embodiment is different from the spoiler 10 of the first embodiment (see FIG. 2) in the shapes of the protrusions 51 and 52. Other basic configurations are the same as those of the spoiler 10 of the first embodiment. Parts and elements common to those of the first embodiment are denoted by the same reference numerals, and detailed description thereof is omitted.

The protrusion 51 among the two protrusions is formed in a substantially H-shape. Two longitudinal projections 51a extending in the front-rear direction have the same shapes as those of the projections 36 (see FIG. 3B), and a lateral projection 51b is formed so as to connect the centers of the longitudinal projections 51a. Since the contact area with the moving mold 44 is increased and the rigidity of the longitudinal protrusions 51a is enhanced with respect to the vibrating direction of the vibration welding, it is possible to provide more reliable support.

The other protrusion 52 extends in the left-right direction. It can be said that the protrusion 52 is a protrusion extending in a direction perpendicular to the extending direction of the slope portion 22 (see FIG. 2). The contact area with the moving mold 44 is increased, and it is possible to provide uniform support in the width direction.

The spoiler 10A having the above-described protrusions 51 and 52 also exhibits predetermined advantages of the present invention.

It should be noted that although the vibration welded article according to the present invention has been described by taking the tailgate spoiler as an example, the present invention is also applicable to other vehicle parts and components. Furthermore, the present invention is applicable to other than the vehicle parts and components, and is not limited to the above-mentioned ones.

A camera, a duct or the like, other than the stop lamp, may be provided in the outer member opening of the vibration welded article as "another component SI" and the "another component SI" is not limited to the above-mentioned ones.

The above-described embodiments may be combined in a desired manner under given conditions. For example, it is possible to form a protrusion along the extending direction of the slope portion and another protrusion extending in a direction perpendicular to the extending direction of the slope portion on a single second joint surface portion. Further, it is possible to form the distal end surfaces of the H-shaped long protrusions or the left and right elongated protrusions such that the distal end surfaces extend substantially parallel to the base surface portion.

As long as the operations and advantages of the present invention are achieved, the present invention is not limited to the above-described embodiments.

The vibration welded article of the present invention is suitable for a tailgate spoiler.

What is claimed is:

1. A vibration welded article comprising:
an outer member including a substantially V-shaped portion; and
an inner member disposed inside the substantially V-shaped portion of the outer member and vibration welded to the outer member,
the outer member including a substantially plate-shaped base surface portion, and a slope portion formed obliquely relative to the base surface portion and facing the base surface portion,
the slope portion including an outer member opening which is opened to attach another component, and
the inner member including a first joint surface portion that is vibration welded to the base surface portion, a second joint surface portion that is vibration welded to the slope portion, and at least one protrusion that protrudes from the second joint surface portion toward the base surface portion.

2. The vibration welded article according to claim 1, wherein the inner member further includes a standing wall portion which stands from the first joint surface portion to the second joint surface portion, and
the standing wall portion includes an inner member opening which is opened at a position facing the outer member opening.

3. The vibration welded article according to claim 1, wherein when an imaginary surface, which is parallel to the base surface portion and extends from one of edges of the outer member opening closest to the second joint surface portion, is taken as a reference surface, the at least one protrusion protrudes to a position closer to the base surface portion than the reference surface.

4. The vibration welded article according to claim 1, wherein a distal end surface of the at least one protrusion is present on a surface intersecting the second joint surface portion.

5. The vibration welded article according to claim 1, wherein the at least one protrusion includes a plurality of parallel protrusions formed at a plurality of positions.

6. A vibration welding apparatus for manufacturing the vibration welded article according to claim 1, the vibration welding apparatus comprising:
a receiving mold on which the outer member is placed;
a vibrating mold for pressing the first joint surface portion toward the base surface portion and generating vibrations to vibration weld the first joint surface portion to the base surface portion;
a pressing mold for pressing the slope portion toward the second joint surface portion; and
a moving mold movable from the outer member opening toward the at least one protrusion and capable of abutting against the at least one protrusion.

7. A method of manufacturing the vibration welded article according to claim 1, wherein the slope portion and the at least one protrusion are kept sandwiched when the inner member is welded to the outer member.

8. A method of manufacturing the vibration welded article according to claim 1, the method comprising:
placing the outer member and the inner member on a top surface of a receiving mold;
lifting the receiving mold to a position where the first joint surface portion abuts against a vibrating mold;
causing a moving mold to enter the outer member opening, and arranging the moving mold such that an upper surface of the moving mold is able to abut against the at least one protrusion;
swinging the pressing mold until the pressing mold abuts against the slope portion; and
operating the vibrating mold to vibration weld the inner member to the outer member.

* * * * *